Feb. 19, 1946.  O. KORNEI  2,395,127
TIME MEASURING INSTRUMENT
Filed April 19, 1944
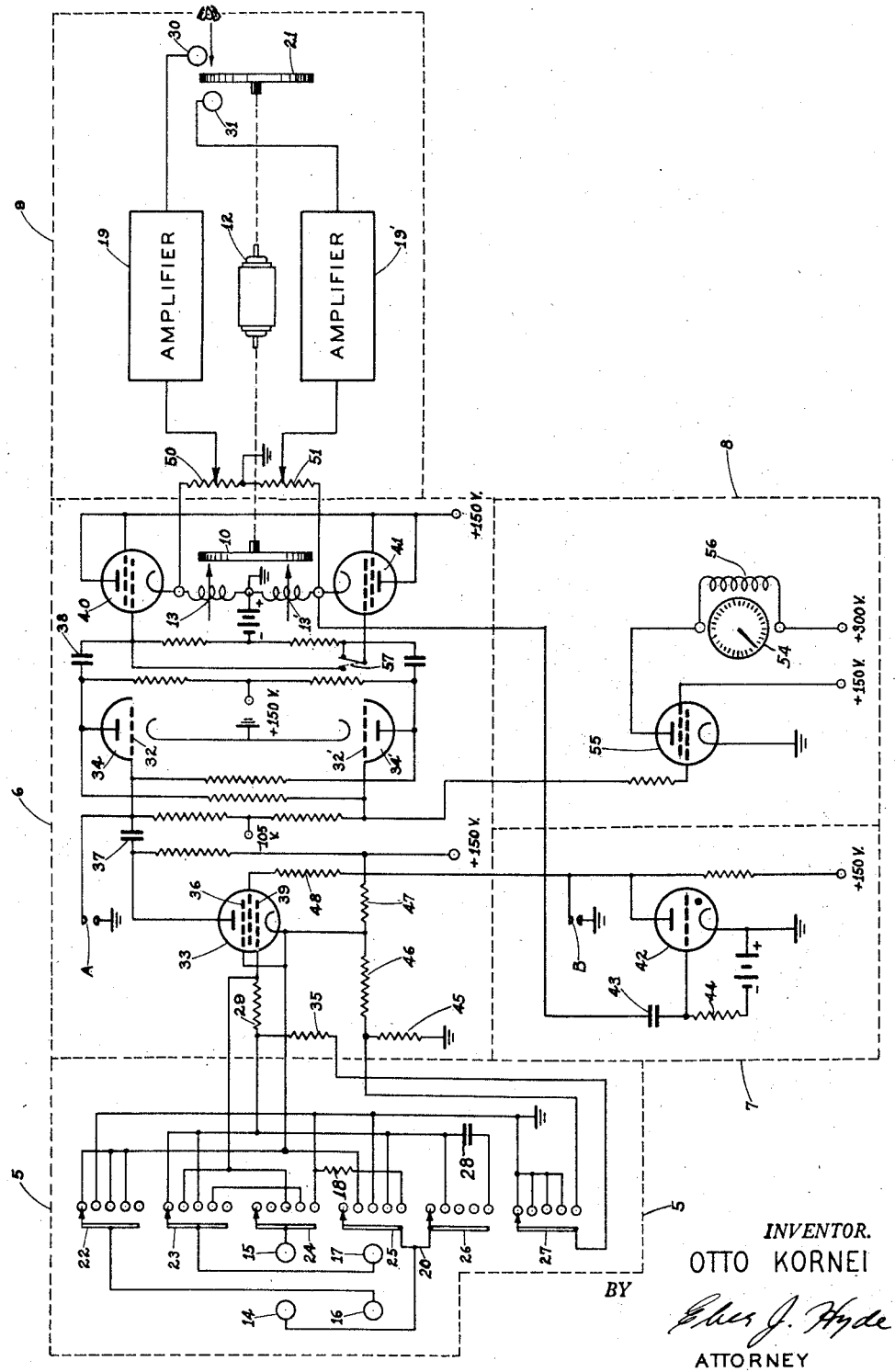
INVENTOR.
OTTO KORNEI
BY
Elmer J. Hyde
ATTORNEY Patented Feb. 19, 1946

2,395,127

UNITED STATES PATENT OFFICE 2,395,127

TIME-MEASURING INSTRUMENT

Otto Kornei, Cleveland Heights, Ohio, assignor to The Brush Development Company, Cleveland, Ohio, a corporation of Ohio Application April 19, 1944, Serial No. 532,026

13 Claims. (Cl. 161—15)

My invention pertains to time measuring instruments and more particularly to a chronoscope of the magnetic type which has been disclosed in my Patent No. 2,370,176.

Briefly, the magnetic chronoscope described in this patent comprises an endless track on a magnetizable signal carrier and means for cyclically moving the signal carrier at a known and constant rate of speed. For practical purposes, I utilize a steel disk rotated by a synchronous motor. Magnetic transducer means (which may be magnetic heads which combine the functions of recording and reproducing or separate magnetic recording and reproducing heads) are associated with the disk and a source of recording current is connected to the recording means.

A mechanical or electronic switch is provided in the circuit between the current source and the recording means and is controlled in accordance with the interval to be measured to cause a first magnetic pulse to be recorded on the rotating disk at the start of the interval to be measured and to cause a second magnetic pulse to be recorded on the rotating disk at the end of the interval to be measured. Between the recording of the first and the second magnetic pulse, the disk rotates through a certain angle depending upon the rate of rotation of the disk and upon the length of the interval to be measured. Thus, if the rate of rotation of the disk is known or if the chronoscope is calibrated, determining the time interval is reduced to measuring the angular displacement of the disk during the interval to be measured. This measurement is made by repeatedly rotating the disk past magnetic reproducing means to repeatedly establish electrical pulses corresponding to the beginning of the interval to be measured and to repeatedly establish electrical pulses corresponding to the end of the interval to be measured, thus establishing two independent series of pulses. One series of pulses is utilized to flash a first glow lamp and the second series of pulses is utilized to flash another glow lamp. Associated with the two glow lamps is a scale disk rotating in synchronism with the steel disk, and the repeated momentary flashing of the first glow lamp by the first series of pulses will, by the stroboscopic effect, cause the scale disk to appear to stand still in one position, and the repeated momentary flashing of the other glow lamp by the second series of pulses will cause the scale disk to appear to stand still in another position.

The angular displacement of the steel disk may be determined from the two readings of the scale disk, and knowing the rate of rotation of the steel disk, the duration of the interval to be measured may be determined.

It is also possible by means described in my previous application to measure intervals whose duration is longer than the time required for one revolution of the steel disk.

This present application is concerned with a multi-position selector switch and electronic control means for establishing a characteristic type and sequence of magnetic signals for enabling the operator to measure time intervals defined by a number of different types of electric pulses such as the closing time of a normally open switch, the opening time of a normally closed switch, the operating time for an electromagnetic relay, etc. Another feature of this application is a circuit whereby an immediate indication of the duration of a time interval is obtained without throwing a switch between the recording and playback of the magnetic pulses. A further feature is a new type of range extension wherein an electric stop-clock is utilized in combination with my magnetic chronoscope for accurately determining the duration of time intervals of any length within the range of the stop-clock with the same high degree of accuracy which is inherent in the chronoscope described in my previous application; and another feature is a quick, simple, yet accurate method of checking the calibration of my chronoscope without using a special external signal source or device.

It is, therefore, an object of my invention to provide a magnetic chronoscope which will measure intervals of long duration with a high degree of accuracy.

It is an object of my invention to provide a magnetic chronoscope having a wide time interval range of operation and only a small constant error throughout that range of operation.

A further object of my invention is to provide a chronoscope which will automatically give an immediate indication of the recorded time interval.

A further object of my invention is to provide a chronoscope for measuring a time interval whose beginning and end may be defined by any one of a number of different types of electric pulses without any special devices other than a selector switch.

Another object of my invention is to provide a method of calibrating chronoscopes which method utilizes no external signal source and is quick, simple and accurate.

Another object of my invention is to provide a chronoscope which upon recording a time interval becomes inoperative to further incoming signals until the operator desires to make a new recording.

Other objects and a fuller understanding of my invention may be had by referring to the following description and drawing taken in conjunction with the claims.

The figure shows the mechanical and electrical parts of my invention partially in detail and partially schematically. Certain of the parts are shown in greater detail in my Patent No. 2,370,176.

In the figure there is shown a side view of a magnetizable disk 10 and a scale disk 21, each of which is rotated at a known and constant rate of speed such as by a synchronous motor 12. The magnetizable disk 10 may be a steel disk or it may be a non-magnetic disk onto the face of which there has been deposited (such as by plating, evaporation, or some other method) a film of magnetizable material thereby forming a magnetic signal carrier. The signal carrier may also be a cylinder or an endless loop of magnetizable wire or tape. Two recording-reproducing heads 13 and 13' are associated with two different annular tracks on the steel disk 10 for recording on separate tracks the pulses corresponding to the beginning and the end of the interval to be measured.

The scale disk 21 is preferably of the type shown in detail in my copending application and is predominantly opaque to the passage of light and is predominantly non-reflecting. The zero point indication on the scale is made opaque and highly light reflective, or opaque and fluorescent with substantially no after glow, and all the other scale indications around the disk are made transparent to light. A glow lamp 30 is mounted in front of the disk 21 with its light directed toward the surface thereof, and is connected to an amplifier 19 and the reproducing head 13 so that it will fire only for an electromotive force established in accordance with the first recorded magnetic pulse. A glow lamp 31 is mounted behind the disk 21 and is responsive only to an electromotive force established by reproducing head 13' and amplifier 19' in accordance with the second recorded magnetic pulse. During reproduction the bulb 30 will flash once for each revolution of the magnetic disk 10, and will illuminate the scale 21 at a point corresponding to the start of the interval to be measured. By the stroboscopic effect the scale 21 will appear to be standing still, and the observer will see only the light reflective zero point indication. By circumferentially adjusting the position of the reproducing heads 13 and 13' with respect to the magnetic disk 10 but without changing the relative position between the two heads, the zero point on the scale 21 may be made to appear at any point around the scale without influencing the absolute value of the reading. For convenience the heads 13 and 13' may be moved until the zero point on the scale 21 is at the top of the disk where strong intermittent flashes from the bulb 30 are reflected from the zero point indication into an observer's eye. To the observer the disk will appear to stand still, and will appear to be black except for the zero line which reflects light. This black appearance arises from the black opaque background absorbing the light from bulb 30, and from the transparent scale portion transmitting the light through the disk with no reflection into the observer's eye. Bulb 31 will also flash once for each revolution of the disk, thereby momentarily illuminating the disk in a second position corresponding to the end of the interval to be measured. To the observer the transparent scale indication of the disk 21 will become visible due to transmitted light from bulb 31 and will appear to stand still due to the stroboscopic effect. The zero line, being reflective, is visible only during flashes of bulb 30, and the transparent scale indications are visible only during flashes of bulb 31, thereby giving an overall effect of one single zero line superposed on one scale image. The apparent relative position of the scale image with respect to the zero line provides an indication of the duration of the interval to be measured. To obtain more accurate readings the above mentioned zero line can be replaced by a short section having a number of closely spaced division lines. A further means of distinguishing between the two flashes is to color the bulbs differently.

In the figure the selector switch circuit is indicated by the reference character 5, the recording circuit by the reference character 6, a blocking circuit by 7, the electric stop clock circuit by 8, and the reproducing circuit by the reference character 9.

It is the function of the selector switch 5 in conjunction with the recording circuit 6 to apply to the recording heads 13 and 13' predetermined and identical current pulses at the beginning and at the end of the interval to be measured even though the pulses supplied to the input terminals may be of a variety of types.

The selector switch 5 is connected to four input terminals 14, 15, 16 and 17 which may be on the panel of the chronoscope and to which external electrical circuits are adapted to be connected. The selector switch may be turned to any one of 5 different positions for connecting the input terminals to the recording circuit. Depending upon the type and origin of the electrical signals which define the beginning and the end of the time interval to be measured, different terminal connections and selector switch positions are used. Turning the switch knob actuates six slide bars 22, 23, 24, 25, 26 and 27. Each of the slide bars, therefore, may be placed in any one of five positions. When all of the slide bars are in the first position (which is illustrated in the figure) the selector switch permits the chronoscope to measure the closed time of a normally open contact or switch, i. e., the time which elapses between the closing and reopening of such contact or switch. In the second position the selector switch permits the measurement of the opening time of a normally closed contact. In the third position the selector switch permits a measurement such as the closing time of an electromagnetic relay, that is, the time between closing of the relay's magnetic circuit and the actual closing of the relay contacts. Position 4 of the selector switch permits the measurement of the opening time of an electromagnetic relay, that is, the time elapsing between the closing of the relay's magnetic circuit and the actual opening of the relay contacts. Position 5 of the selector switch permits the measurement of a time interval between two short electric pulses of opposite polarity.

These five measurements are illustrated by way of example but time intervals defined by other different types of electrical signals may also be measured by the magnetic chronoscope by using a special selector switch incorporating positions for the other types of electrical signals.

Position 1 of the selector switch, which is illustrated, is for the measurement of the closed time of a normally open contact. One side of the external contact is connected to terminal 16 and the other side to the terminal 17, the terminals 14, 15 remaining unused. The control tube 33 is biased due to the voltage drop existing across resistors 45, 46, which voltage drop has a sufficiently high negative value to cut off the plate current through tube 33 when it is applied through resistors 35 and 29 to the grid 32. When the external contact connected to terminals 16, 17 is closed the grid 39 of the control tube 33 is brought to cathode potential and consequently plate current starts to flow. When the contact is opened the grid bias is restored and the plate current stops. The starting and ending of the plate current flow causes a negative and a positive pulse, respectively, to pass through the condenser 37 and be applied to the grid 32 of the trigger tube 34, 34'. This tube is a double triode whose two halves are interconnected to form an Eccles-Jordan trigger circuit. This trigger circuit is set up in such a way that the upper half 34 of the tube is normally conducting and the lower half normally non-conducting. Upon arrival of the negative voltage pulse on the grid of the upper half 34 the trigger circuit will quickly switch or "flop" over into its second stable state making the upper half non-conducting and the lower half conducting. This "flopping" of the trigger circuit, in turn, causes a positive voltage pulse to be transmitted through the condenser 38 to the grid of tube 40. The tube 40 is normally biased beyond cut-off and will consequently become momentarily conducting and transmit a current pulse through the recording head 13 to cause a short magnetic pulse to be recorded on one track on the rotating disk 10. Simultaneously a negative voltage pulse will be applied to the grid of tube 41. This pulse, however, will have no effect since tube 41 is biased beyond cutoff.

At the end of the interval to be measured a positive voltage pulse is applied to the grid 32 of tube 34, 34' and a similar sequence of events only of opposite direction will take place causing tube 41 to receive a positive grid pulse thus causing a momentary current flow through recording head 13' which magnetically records a pulse on the other track on the rotating steel disk 10. The values of the resistors 50, 51 are high compared to the impedances of the heads 13, 13'. Consequently, substantially all of the plate current of the tubes 40, 41 will flow through the heads. It will be seen that the amplitude and shape of the original voltage pulses at the grid of tube 33 has no influence upon the amplitude and shape of the current pulses through the recording heads.

Position 2 of the selector switch 5 permits the measurement of the open time of a normally closed contact or switch, i. e., the time which elapses between the opening and reclosing of such contact or switch. The two normally closed external contacts are connected to input terminals 16, 17, terminals 14, 15 remaining unused. Tube 33 is biased beyond cut-off as the lower end of resistor 35 is grounded through slide bar 27 and the cathode of the tube is at a positive potential relative to ground substantially equal to the voltage drop across resistors 45, 46. The junction between resistors 29, 35 is connected to the cathode and the screen grid 36 of tube 33 by means of the connection 20 between slide bars 25 and 26. Terminal 16 is connected to ground, and terminal 17, through slide bar 23, is connected to the grid 39 of tube 33. The opening and reclosing of the external switch or contact removes and then restores the cut-off bias of tube 33, thereby causing plate current to start and then to stop. This transmits pulses of the required type through condenser 37 to the trigger circuit.

Position 3 of the selector switch 5 permits the measurement of the closing time of a relay, i. e., the time which elapses between the closing of the relay magnet circuit and the closing of the relay contacts. The tube 33 is biased beyond cut-off, as has been explained. The terminals 14, 15 externally are connected to the contacts of the relay; internally the terminal 14, through slide bar 25, is connected to ground, and the terminal 15, through slide bar 24, is connected to grid 39 of tube 33. The terminals 16, 17 externally are connected across the switch which closes the relay magnet circuit; internally the terminal 16, through slide bar 22, is connected to the cathode and screen grid 36; terminal 17, through slide bar 23, is connected to the junction of resistors 29, 35. Care should be exercised to see that the positive pole of the relay battery is connected to input terminal 16.

Position 4 of the selector switch 5 permits the measurement of the opening time of a relay, i. e., the time which elapses between the closing of the relay magnet circuit and the opening of the relay contacts. Tube 33 is biased beyond cut-off, as has been explained. The terminals 14, 15 externally are connected to the contacts of the relay; and internally the terminal 14, through slide bar 25, is connected to the junction between resistors 29, 35; terminal 15, through slide bars 24, 23, is connected to the terminal 17. The terminals 16, 17 externally are connected across the relay key with the positive pole of the relay battery connected to input terminal 16; and internally the terminal 16 is connected, through slide bar 22, to the cathode of tube 39.

Position 5 of the selector switch 5 permits the measurement of the time interval between two short electric pulses of opposite polarity, the first pulse being positive with respect to ground. The tube 33 is connected as a class-A amplifier, with the lower end of resistor 35 connected, through slide bar 27, to the junction between resistors 45 and 46. This connection supplies tube 33 with a grid bias equal to the voltage drop across resistor 46. Terminals 14 and 15 are externally connected to the pulse source, terminals 16 and 17 remaining unused. Terminals 14, 15 are internally terminated by a resistor 18 between slide bars 25 and 26, and terminal 15 is grounded. Terminal 14 is internally connected through condenser 28 to the junction between resistors 29 and 35.

It should be noted that the pole pieces of the two recording heads 13 and 13' (symbolized by the arrows) are associated with different annular tracks on the disk to prevent interference between the two magnetically recorded pulses and to facilitate separation of the two pulse series reproduced from the disk.

A blocking circuit 7 is provided and associated with the screen 36 of the control tube 33 for rendering the recording circuit of the instrument inoperative for subsequent signals after a time interval has been recorded on the steel disk. This blocking action is desirable in order to prevent any signal subsequent to the ending pulse from being recorded and, consequently, from interfering with the measurement. The circuit comprises a thyratron tube 2 and its associated elements and it operates when the second recording pulse, which represents the end of the interval to be measured, passes through the head 13'. The momentary voltage pulse then established across the head is fed through the condenser 43 to the grid of the tube 42 thus firing this tube. The cathode of the tube 33 is biased positively with respect to ground by means of a voltage divider consisting of resistors 45, 46 and 47 and it obtains its screen voltage through the resistor 48 from the plate of the thyratron 42. As long as the thyratron 42 is non-conducting, tube 33 is supplied with its proper screen voltage. Upon the firing of the thyratron, however, this voltage is reduced to a slightly negative value with respect to the cathode of tube 33 thus blocking this tube and rendering the recording circuit of the instrument inoperative to further incoming signals. The blocking circuit is re-set preparatory to receiving a new recording by actuating a push button switch to cause blade B to momentarily ground the anode of thyratron 42, thus extinguishing this tube and restoring the screen voltage to tube 33.

The magnetic heads 13 and 13' are utilized both for recording and reproducing. Immediately after the signal has been recorded, the next rotation of the disk will cause the recorded magnetic pulses to pass the heads 13 and 13' which now act as reproducing heads to establish signal pulses which are applied across the volume controls 50 and 51. The signal reproduced by head 13 is amplified by the amplifier 19 and is utilized to flash the glow lamp 30 associated with the rotating scale disk 21, and the signal reproduced by the head 13' is amplified by the amplifier 19' and is utilized to flash the glow lamp 31 which is also associated with the scale disk 21. The volume controls 50 and 51 may be utilized for adjusting the calibration of the chronoscope as will be described in more detail later.

A push button contact having two blades of which blade A is in the trigger circuit and blade B is in the blocking circuit is provided. After a recording has been made the push button may be actuated by the operator for returning the trigger circuit and the blocking circuit to a reset position preparatory to making a new measurement. An obliterating circuit has not been shown in this application as suitable obliterating means are well known to the art, but a third blade may be provided in the push button contact for energizing the obliterating head at the same time that the trigger and blocking circuits are reset.

The aforegoing description is applicable to all magnetic chronoscopes whether they are designed for measuring intervals shorter or longer than the duration of one revolution of the signal carrier.

One method of range extension, that is, of measuring an interval of a duration longer than the time for one rotation of the signal carrier is described in my aforementioned patent.

Another method of range extension is to utilize an electric stop clock whose circuit is indicated by the reference character 8 and which comprises a tube 55 and its associated elements. The purpose of the tube 55 is to energize the winding 56 of the electromagnetic clutch of the stop clock for the duration of the time interval to be measured, thus providing a visual indication of the time interval in the manner of usual electric clocks. The dial 54 of the clock is calibrated in intervals corresponding to the time of one full revolution of the signal carrier. Thus, for instance, if the magnetizable disk is driven at a rate of 1800 revolutions per minute (which is one revolution in 33⅓ milliseconds) then the incremental divisions on the face of the stop clock should each be equivalent to 33⅓ milliseconds.

The tube 55 obtains its grid bias from the grid of the half tube 34' of the trigger circuit. When the instrument is ready for operation this bias is sufficient to cut-off the current flow through the tube 55. As the trigger circuit operates upon receiving a starting pulse the bais on tube 55 is reduced to a value low enough to allow plate current to flow. This plate current energizes the clutch winding 56 of the electric stop clock thereby starting the clock and upon the ending pulse actuating the trigger circuit the bias on tube 55 is restored, stopping the flow of current through the winding 56 and stopping the clock. The clock hand will move during the interval to be measured, and the magnetizable disk 10 and the scale disk 21 will keep on rotating continuously. The divisions on the clock face and the rate of rotation of the disks are so related that the clock indicates accurately the number of full disk revolutions during the interval to be measured but permits, due to its inherent limitation in accuracy, only an estimation of fractional revolutions. The stroboscopic scale reading, however, indicates the exact amount of such fractions so that the number of completed disk revolutions obtained from the clock together with the stroboscopic scale reading indicating the fractional excess will accurately measure intervals of any duration within the range of the stop clock.

In order for my time measuring instrument to give accurate readings within its limits of inherent error it is necessary that its calibration can be checked and, if necessary, corrected. This procedure may be carried out in several ways. One way is to record a time interval of known duration on the moving magnetizable member and upon repeated reproduction compare the instrument indication with the known duration. Another way is to record a time interval of arbitrary duration on the magnetizable member while the member is standing still. Then, with the magnetizable member rotating to repeatedly reproduce the magnetic signals thereon, the instrument must, if properly adjusted, indicate a zero time interval since there was no motion of the magnetizable member between the recording of the beginning and the recording of the end of the interval to be measured. If the instrument is not properly adjusted the indication will slightly differ from zero.

In this case correction can be made by adjusting the potentiometers 50, 51 which changes the gain of the two playback channels. This, owing to the finite slope of the recorded pulses, changes slightly the instant at which the glow lamps 30 and 31 fire. Changing either one of the potentiometers will, consequently, result in either a positive or negative deviation of the reading depending upon which of the two reproducing channels has the higher gain. The gain of either one or both of the playback channels may be altered to effect correction of the instrument.

Another way of checking the calibration is to simultaneously record a magnetic signal on each of the two separate tracks while the signal carrier is rotating. Upon repeated reproduction of the recorded signals the instrument must indicate a zero time interval since the recorded interval was of zero duration. This can be done by throwing switch 57 into its second position which is shown by a dotted line, thereby connecting the grids of tubes 40, 41 in parallel, and by applying a proper signal to the input terminals. This proper signal, for the illustrated position of the selector switch 5, may be obtained by temporarily short-circuiting the input terminals 16, 17. If properly adjusted the instrument must now again indicate a zero time interval. If it does not, adjustment should be made as has been previously explained. These last two methods are advantageous as they do not require supplying to the instrument electric pulses defining a time interval of known duration which is sometimes difficult to do, and they employ only the instrument itself. That is, no external device is required which might introduce an error into all subsequent measurements.

While I have described my invention with a certain degree of particularity, it is to be understood that it is only by way of example, and that numerous changes can be made in the individual parts, their arrangement, and in their cooperative relationship without departing from the spirit and scope of my invention.

I claim as my invention:

1. In a magnetic recording and reproducing device utilizing transducer means and a magnetizable signal carrier, input signal circuit means connected to said transducer means for magnetically recording a signal on said magnetizable signal carrier, and output signal circuit means connected to said transducer means, said input signal circuit means and said output signal circuit means both being operatively connected to said transducer means at all times.

2. The device as set forth in claim 1, further characterized in this: that the said transducer means comprises a single record-reproducing head.

3. The invention as set forth in claim 1, further characterized in this: that an amplifier comprises part of the input signal circuit means, and a separate amplifier comprises part of the output signal circuit means.

4. The invention as set forth in claim 1, further characterized in this: that the said transducer means comprises a single recording-reproducing head, and that an amplifier comprises part of the input signal circuit to said transducer means, and that a separate amplifier comprises a part of the output signal circuit means from said transducer means.

5. In a chronoscope for measuring a time interval, a magnetizable signal carrier, means for cyclically moving said signal carrier with a known and constant period, a stop clock calibrated in intervals corresponding to the period of said signal carrier, means for magnetically recording on said signal carrier a signal corresponding to the beginning and a signal corresponding to the end of the interval to be measured, means for starting and stopping said stop clock in accordance with the beginning and the end of this interval whereby an indication is obtained of the total number of whole periods of said signal carrier during said interval to be measured, and means for repeatedly reproducing the magnetic record on said signal carrier for obtaining an indication of any fractional period, the duration of said time interval being the sum of said whole periods as indicated by said stop clock and said fractional period as indicated in accordance with the magnetic record on said signal carrier.

6. The invention as set forth in claim 5, further characterized in this: that said stop clock is electrically controlled and that electric pulses for recording the magnetic pulses on the moving signal carrier corresponding to the beginning and the end of the interval to be measured are utilized simultaneously for starting and stopping the clock.

7. A time interval measuring device comprising, in combination, a stop clock having a given degree of accuracy and calibrated in increments corresponding to certain periods of time, a magnetic time measuring device capable of measuring intervals up to the said certain period of said stop clock and with a degree of accuracy higher than the accuracy of said stop clock and including a magnetizable signal carrier, means for simultaneously starting said stop clock and magnetically recording a signal on said signal carrier in accordance with the beginning of the interval to be measured, means for simultaneously stopping said stop clock and magnetically recording a signal on said signal carrier in accordance with the end of the interval to be measured, said interval being determined by combining the indications of both the stop clock and the magnetic device for obtaining the measurement of a time interval longer than could be measured by the magnetic device alone and with a higher degree of accuracy than could be obtained by the stop clock alone.

8. In the method of calibrating a magnetic chronoscope as defined and utilizing cyclically moving signal carrier means having two recording tracks and utilizing two magnetic recording heads one adapted to record a magnetic signal corresponding to the beginning of the interval to be measured on one track of the carrier and the other adapted to record a magnetic signal corresponding to the end of the interval to be measured on the other track of the carrier; comprising the steps of: recording on one track a magnetic signal utilizing one of said recording heads and recording on the other track a magnetic signal utilizing the other of said recording heads while said magnetizable signal carrier is standing still, repeatedly reproducing each of the said recorded signals through separate reproducing circuits, while said signal carrier is moving, and adjusting elements of said chronoscope until the indicated time interval is zero.

9. The method as set forth in claim 8, further characterized in that each reproducing circuit includes an amplifier, and by adjusting at least one of said two amplifiers until the indicated time interval is zero.

10. In the method of calibrating a magnetic chronoscope as defined and utilizing cyclically moving signal carrier means having two recording tracks and utilizing two magnetic recording heads one adapted to record a magnetic signal corresponding to the beginning of the interval to be measured on one track of the carrier and the other adapted to record a magnetic signal corresponding to the end of the interval to be measured on the other track of the carrier; comprising the steps of: recording on one track a magnetic signal utilizing one of said recording heads and simultaneously recording on the other track a magnetic signal utilizing the other of said recording heads while said magnetizable signal carrier is rotating, repeatedly reproducing each of the said recorded signals through separate reproducing circuits, and adjusting elements of said chronoscope until the indicated time interval is zero.

11. The method as set forth in claim 10, further characterized in that each reproducing circuit includes an amplifier, and by adjusting at least one of said two amplifiers until the indicated time interval is zero.

12. In a time measuring instrument which includes signal recording means and which requires for the energization of its signal recording means predetermined types of electrical pulses generated at the beginning and at the end of the interval to be measured; input terminals across which the externally available electrical signals are applied, a selector switch which is connected to said input terminals, and a control tube circuit the input of which is connected to said selector switch and the output of which tube circuit is connected to said signal recording means, said selector switch and said control tube circuit transforming the external signals received from said input terminals into said predetermined type for said signal recording means.

13. In a chronoscope adapted to magnetically record a signal corresponding to the beginning and a signal corresponding to the end of a time interval to be measured and which requires for the energization of its signal recording means predetermined types of electrical pulses generated at the beginning and at the end of the interval to be measured; input terminals across which the externally available electrical signals are applied, a selector switch which is connected to said terminals and which has a plurality of positions each corresponding to a different type of external electrical signal, control tube means connected to said selector switch for establishing for any position of said selector switch two voltage pulses, one corresponding to the beginning and the other corresponding to the end of the interval to be measured, a trigger circuit having two stable states connected to the output of said control tube, said trigger circuit being arranged so that upon the arrival of a first voltage pulse it will quickly switch from the first stable state to the second stable state and remain there until the arrival of a second voltage pulse at which instant it will quickly switch back into said first stable state, and magnetic recording means connected to said trigger circuit, said trigger circuit as it quickly switches from one stable state to another stable state causing a current pulse to flow in said magnetic recording means.

OTTO KORNEI.

Certificate of Correction

Patent No. 2,395,127.   February 19, 1946.

OTTO KORNEI

It is hereby certified that errors appear in the printed specification of the above numbered patent requiring correction as follows: Page 3, second column, line 75, for "tube 2" read *tube 42*; page 4, second column, line 11, for "bais" read *bias*; page 5, first column, line 38, claim 2, for "record-reproducing" read *recording-reproducing*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*